(12) United States Patent
Furukawa et al.

(10) Patent No.: US 7,866,754 B2
(45) Date of Patent: Jan. 11, 2011

(54) HEADRESTS FOR VEHICLE SEATS

(75) Inventors: Kenji Furukawa, Toyota (JP); Kimitaka Ando, Toyota (JP); Ryoshu Nakane, Toyota (JP)

(73) Assignee: Toyota Boshoku Kabushiki Kaisha, Kariya-Shi, Aichi-Ken (JP)

( * ) Notice: Subject to any disclaimer, the term of this patent is extended or adjusted under 35 U.S.C. 154(b) by 43 days.

(21) Appl. No.: 12/210,529

(22) Filed: Sep. 15, 2008

(65) Prior Publication Data

US 2009/0134683 A1    May 28, 2009

(30) Foreign Application Priority Data

Oct. 22, 2007    (JP) .............................. 2007-273727

(51) Int. Cl.
A47C 7/36    (2006.01)
(52) U.S. Cl. ...................................... 297/391; 297/408
(58) Field of Classification Search .................. 297/391, 297/408, 410
See application file for complete search history.

(56) References Cited

U.S. PATENT DOCUMENTS

| | | | | |
|---|---|---|---|---|
| 5,895,094 | A * | 4/1999 | Mori et al. ................... | 297/410 |
| 5,927,813 | A * | 7/1999 | Nemoto ....................... | 297/391 |
| 6,935,696 | B2 * | 8/2005 | Gauthier et al. ............. | 297/408 |
| 7,066,545 | B2 * | 6/2006 | Terada et al. ................. | 297/410 |
| 7,121,625 | B2 * | 10/2006 | Malsch et al. ................ | 297/410 |
| 7,226,124 | B2 * | 6/2007 | Mori et al. ..................... | 297/61 |
| 7,445,397 | B1 * | 11/2008 | Lai .......................... | 403/109.1 |
| 7,600,818 | B2 * | 10/2009 | Ebbeskotte et al. .......... | 297/408 |

FOREIGN PATENT DOCUMENTS

JP    2006-128025 A    5/2006

OTHER PUBLICATIONS

English language Abstract of JP 2006-128025 A.

* cited by examiner

*Primary Examiner*—Sarah B McPartlin
(74) *Attorney, Agent, or Firm*—Greenblum & Bernstein, P.L.C.

(57) ABSTRACT

A headrest for a vehicle seat has a tubular stay to be attached to a seatback and a connector to be connected to an end of the stay. The stay includes a shaft hole, an attachment hole, and a notched surface. The attachment hole penetrates from an outer surface of the stay to the shaft hole in the radial direction. The notched surface is circumferentially adjacent to the attachment hole and is substantially orthogonal to the attachment hole. The connector includes a cantilevered locking strip to be inserted into the shaft hole while being resiliently deformed. The locking strip includes a projection. The projection fits in the attachment hole by being resiliently restored. And the projection includes an extending portion being wider than the circumferential width of the attaching hole and extending over the notched surface by being resiliently restored.

4 Claims, 7 Drawing Sheets

HEADRESTS FOR VEHICLE SEATS

This application claims priority to Japanese patent application serial number 2007-273727, the contents of which are incorporated herein by reference.

BACKGROUND OF THE INVENTION

1. Field of the Invention

The present invention relates to a headrest for a vehicle seat having tubular stays to be attached to a seatback.

2. Description of the Related Art

In general, a headrest includes tubular stays to be attached to a seatback. In the related art, there is a case in which a cable or wire is inserted into the stays. The cable includes an outer cable and an inner cable inserted into the outer cable. The outer cable is connected to the stay by a connector mounted to an end of the outer cable. The inner cable is pulled and slides with respect to the outer cable for tilting the headrest.

The wire, for example, is an electric wire for supplying electric power to electrical components provided in a headrest body. A plurality of the electric wires has a bundled end. A connector (harness) is attached to the bundled end. And the bundle end is connected to an end of the stay by the connector. In Japanese Laid-Open Patent Publication No. 2006-128025, the connector (harness) has a pair of cantilevered beam-shaped locking strips to be inserted into a shaft hole of the stay while being resiliently deformed. The locking strips are formed with projections which are fitted into attachment holes formed on the stay by being resiliently restored.

However, the connectors configuration comes apart from the stay by deforming the locking strips only in the radial direction. Therefore, there arises a problem such that the engaging force of the connector with respect to the stay deteriorates after having used repeatedly. Thus, there is need in the art for a headrest, in which a stay and a connector are engaged with high stability.

SUMMARY OF THE INVENTION

One aspect of the present invention can include a headrest for a vehicle seat includes a tubular stay to be attached to a seatback and a connector to be connected to an end of the stay. The stay includes a shaft hole, an attachment hole, and a notched surface. The attachment hole penetrates from an outer surface of the stay to the shaft hole in the radial direction. The notched surface is circumferentially adjacent to the attachment hole and is substantially orthogonal to the attachment hole. The connector includes a cantilevered locking strip to be inserted into the shaft hole while being resiliently deformed. The locking strip includes a projection. The projection fits in the attachment hole by being resiliently restored. And the projection includes an extending portion being wider than the circumferential width of the attaching hole and extending over the notched surface by being resiliently restored.

Therefore, the projection overlaps with the notched surfaces of the stay. Therefore, when disconnected the connector from the stay, it is necessary not only to resiliently deform the locking strips radially toward the center, but also to resiliently deform the projection in the circumferential direction. Consequently, the connector is engaged with respect to the stay with high degree of stability, and hence a structure having less probability of coming apart from the stay after having used repeatedly.

DETAILED DESCRIPTION OF THE INVENTION

Each of the additional features and teachings disclosed above and below may be utilized separately or in conjunction with other features and teachings to provide improved headrests for vehicle seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
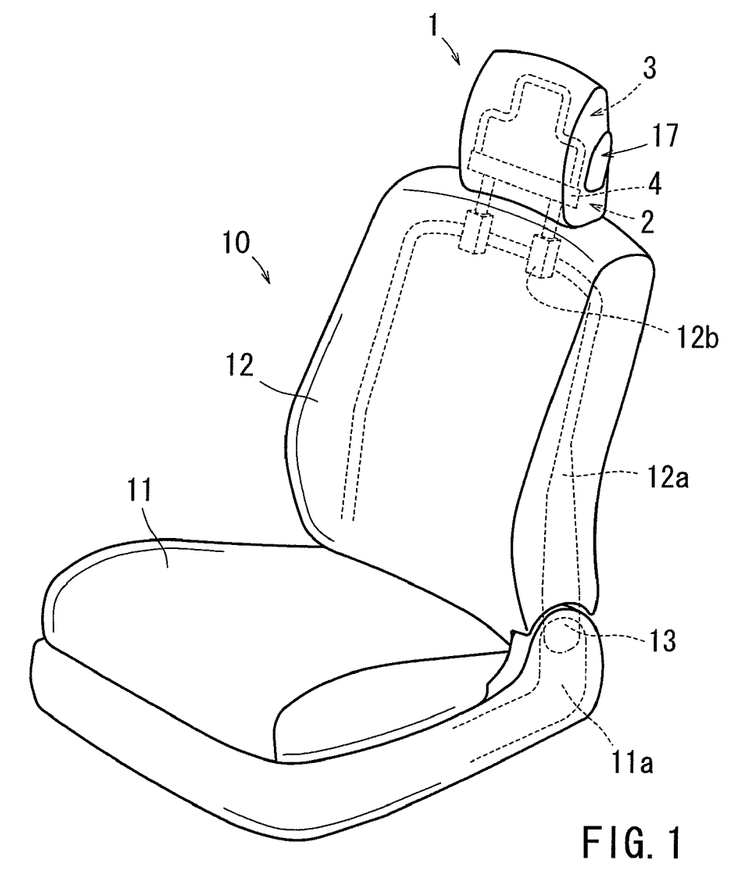
FIG. 1 is a perspective view of a vehicle seat.

As shown in FIG. 1, a vehicle seat 10 includes a seat cushion 11, a seatback 12 and a headrest 1. The seat cushion 11 and the seatback 12 include frames 11a, 12a. A reclining device 13 is provided between the frames 11a, 12a connected thereto so as to be capable of swinging and capable of being adjustable in angle. A pair of tubular attaching members 12b are attached to the upper side of the frame 12a, and the headrest 1 is attached to the attaching members 12b.

Figure 2:
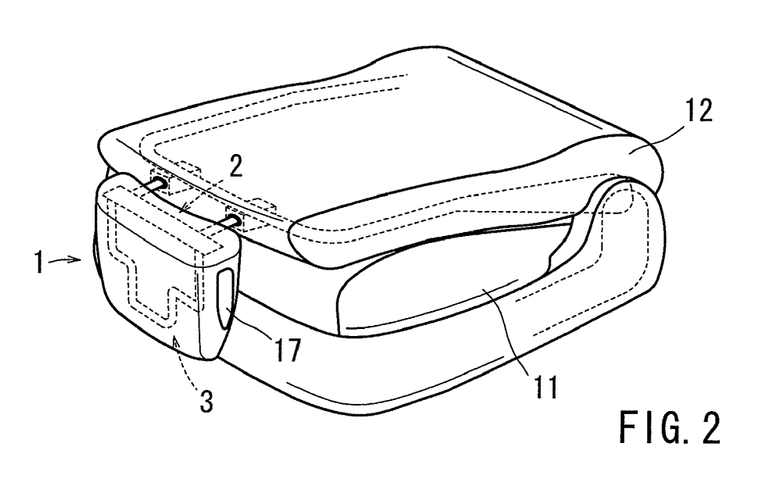
FIG. 2 is a perspective view of the vehicle seat having a seatback moved forward.
Figure 3:
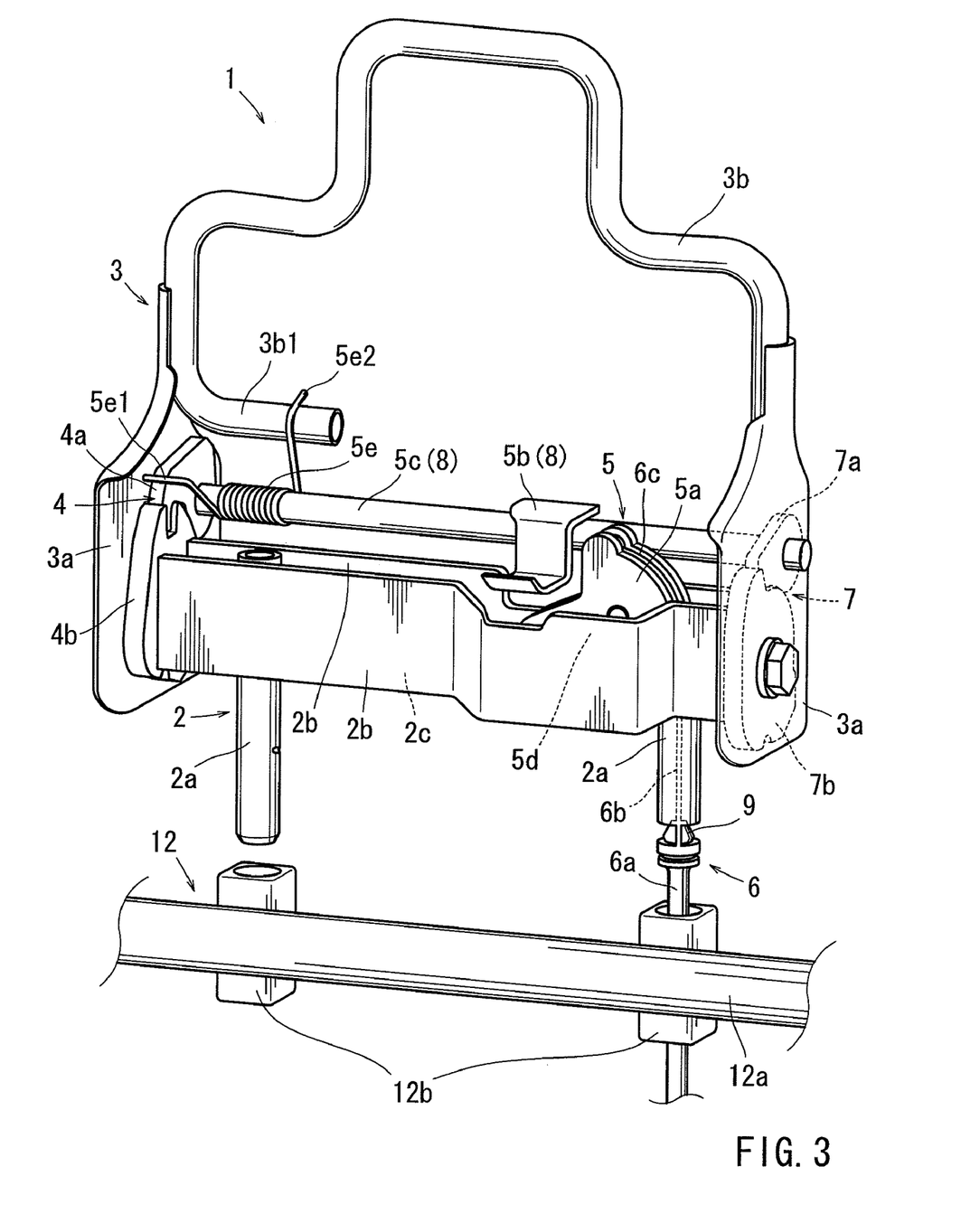
FIG. 3 is a perspective view of a headrest's framework.

The headrest 1 is provided so as to be capable of tilting with respect to the seatback 12 as shown in FIGS. 1 and 2, and is tilted to secure visibility. Alternatively, it is tilted in order to avoid interference of the headrest 1 with a seat in front of the seat 10 when the seatback 12 is inclined forward on the seat cushion 11. As shown in FIG. 3, the headrest 1 includes a base member 2 and a body frame 3 attached to the base member 2 so as to be capable of tilting.

The base member 2 includes a pair of tubular (for example, circular cylindrical) stays 2a and bridge plates 2b for connecting the pair of stays 2a. The stays 2a are slidably inserted into the attaching members 12b and are attached so as to be adjustable in vertical position with respect to the seatback 12. The bridge plates 2b are provided on the front side and the back side of the upper ends of the stays 2a so as to connect the upper ends of the pair of stays 2a with respect to each other.

The body frame 3 includes left and right attaching plates 3a and a tubular connecting tube 3b as shown in FIG. 3. The attaching plates 3a are pivotably attached to the ends of the bridge plates 2b. The connecting tube 3b extends upward from the left and right attaching plates 3a and are joined, so that an upper framework of the headrest 1 is configured.

Provided between a base member 2 and a body frame 3 are, as shown in FIG. 3, a locking device 4 for locking the body frame 3 with respect to the base member 2 at a position in use, and an unlocking device 5 for unlocking the locking device 4. The locking device 4 includes a lock base 4b and a hook 4a. The lock base 4b is mounted to left ends of bridge plates 2b of the base member 2.

The hook 4a is fixed to a rod 5c. The rod 5c is rotatably attached to the attaching plates 3a about the axis thereof. Therefore the hook 4a rotates and tilts together with the rod 5c about the axis of the rod 5c with respect to the body frame 3. Attached between the hook 4a and a connecting tube 3b is an urging member 5e for urging the hook 4a. The hook 4a, being urged by the urging member 5e, rotates with the rod 5c, and a tilting extremity is fitted into a recess on an outer peripheral portion of the lock base 4b. Accordingly, the body frame 3 is locked with respect to the base member 2.

Figure 4:
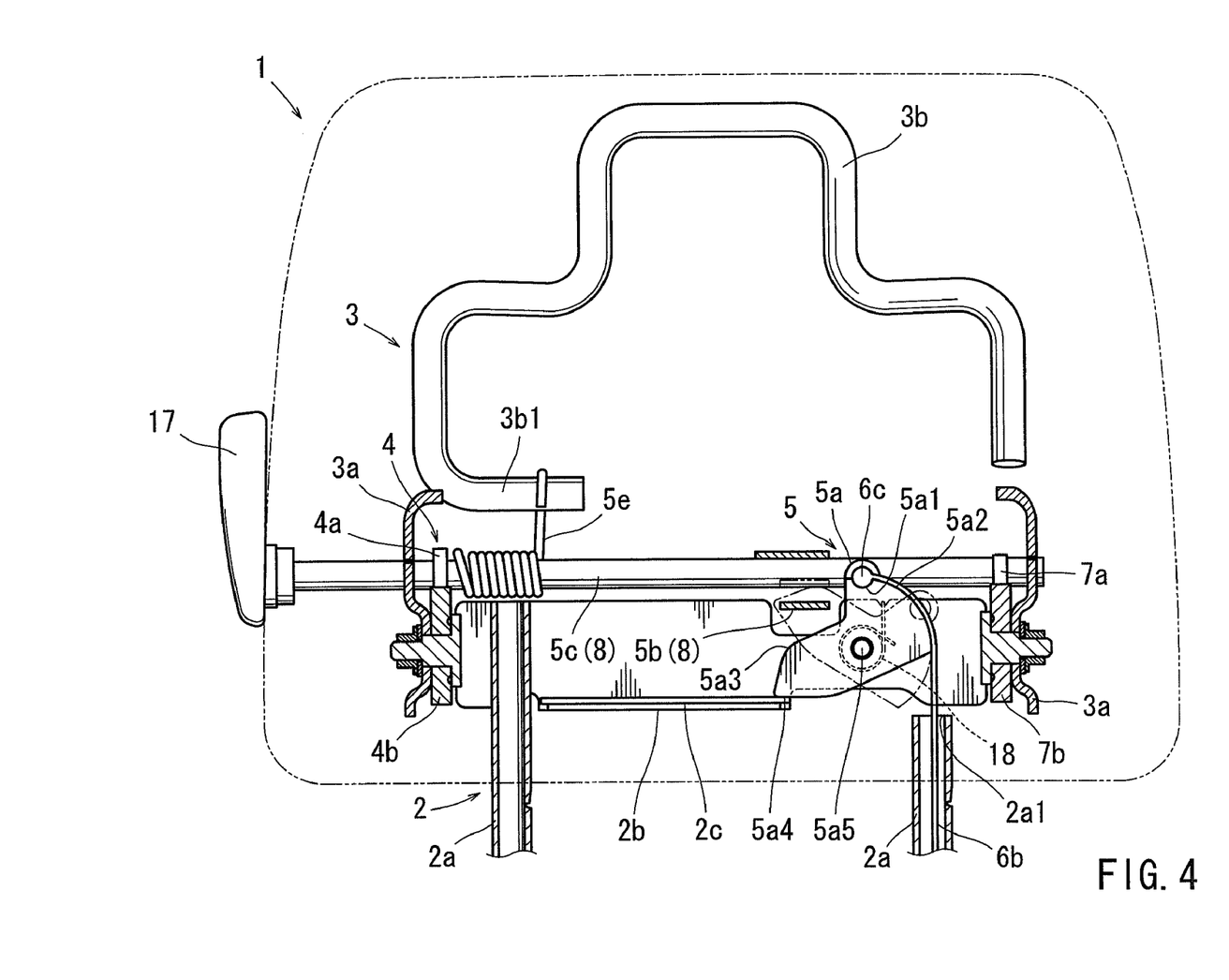
FIG. 4 is a rear view of the headrest's framework.

As shown in FIGS. 3 and 4, the unlocking device 5 includes a swinging body (pulley) 5a and a moving body 8. The swinging body 5a is attached to the bridge plates 2b so as to be capable of swinging. The swinging body 5 includes a connecting portion 5a1 to which an inner cable 6b of a cable 6 is connected and an arcuate-shaped outer peripheral surface 5a2 on which the inner cable 6b is disposed. Provided between the swinging body 5a and the bridge plates 2b is a biasing member 18 for biasing the swinging body 5a. The swinging body 5a is pulled by the inner cable 6b and swings clockwise against the biasing member 18. Then, a force applying portion 5a3 of the swinging body 5a pushes a force receiving member 5b of the moving body 8 upward. When the swinging body 5a is swung counterclockwise by the biasing member 18, a stopper portion 5a4 of the swinging body 5a comes into abutment with a stopper strip 2c formed on the bridge plates 2b, so that the swinging body 5a is retained at an initial position.

As shown in FIGS. 3 and 4, the moving body 8 includes the rod 5c and the force receiving member 5b. The rod 5c extends across the left and right attaching plates 3a, and is attached to the attaching plates 3a so as to be capable of rotation about the axis thereof. The force receiving member 5b protrudes approximately from the center of the rod 5c toward the swinging body 5a, and the tip end thereof is pushed upward by the swinging body 5a when the swinging body 5a swings. Accordingly, the moving body 8 rotates (moves) with respect to the body frame 3 against the biasing member 5e, as the center of the rotation of the moving body is the rod 5c.

When the rod 5c rotates about an axis thereof, the hook 4a tilts together with the rod 5c. Accordingly, the hook 4a comes apart from the lock base 4b, and the locking device 4 is unlocked. Consequently, the body frame 3 is capable of tilting with respect to the base member 2. When the body frame 3 is tilted with respect to the base member 2 in this state, the hook 4a is tilted relatively forward with respect to the lock base 4b.

As shown in FIG. 3, the cable 6 for causing the swinging body 5a to swing includes the inner cable 6b and an outer cable 6a. The outer cable 6a has a tubular shape and includes a connector 9 attached to one end thereof. The connector 9 is connected to the lower end of the stay 2a.

Figure 5:
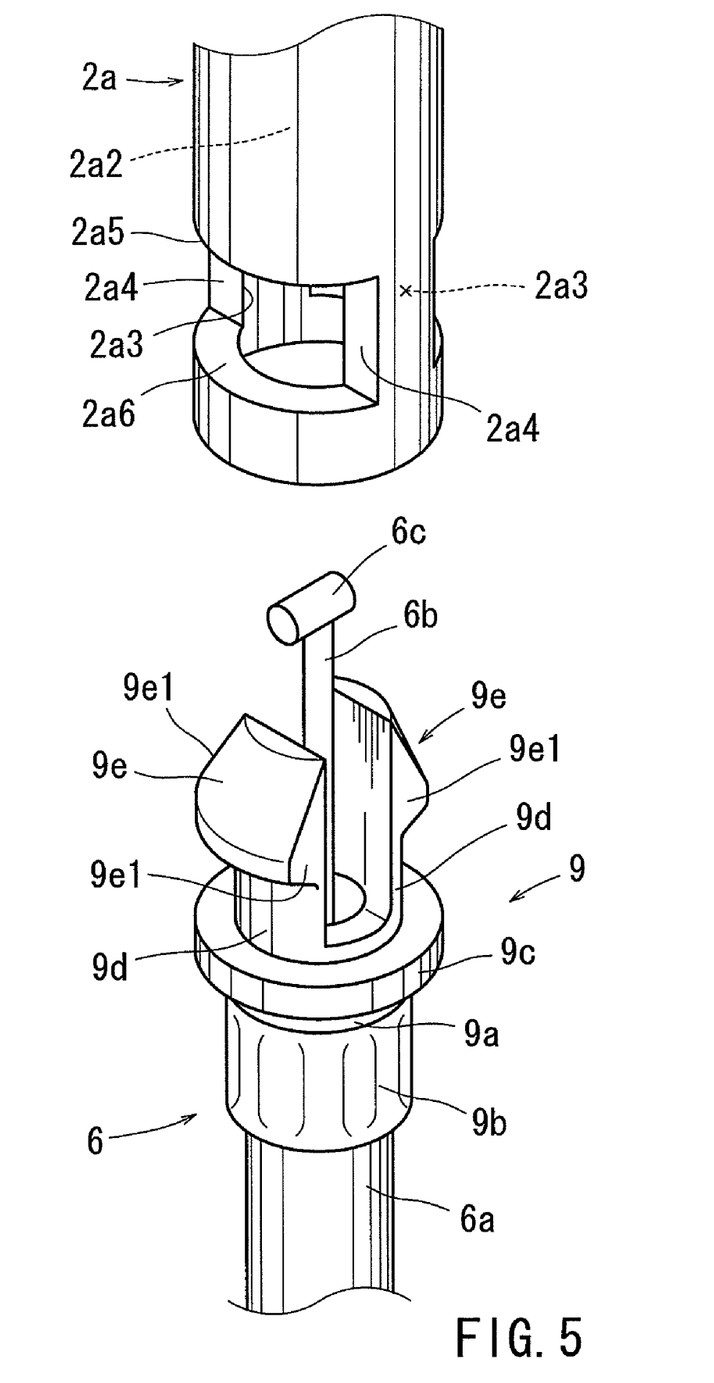
FIG. 5 is a perspective view of a stay, connector and cable.

The stay 2a is formed of metal and, as shown in FIG. 5, includes a shaft hole 2a2 penetrating through the axial center and a pair of attachment holes 2a3 formed near the end of the stay 2a. The attachment holes 2a3 penetrate through the shaft hole 2a2 in the radial direction. Notched surfaces 2a4 are formed at positions circumferentially adjacent to the attachment holes 2a3. The notched surfaces 2a4 are substantially orthogonal to the attachment holes 2a3.

Figure 7:
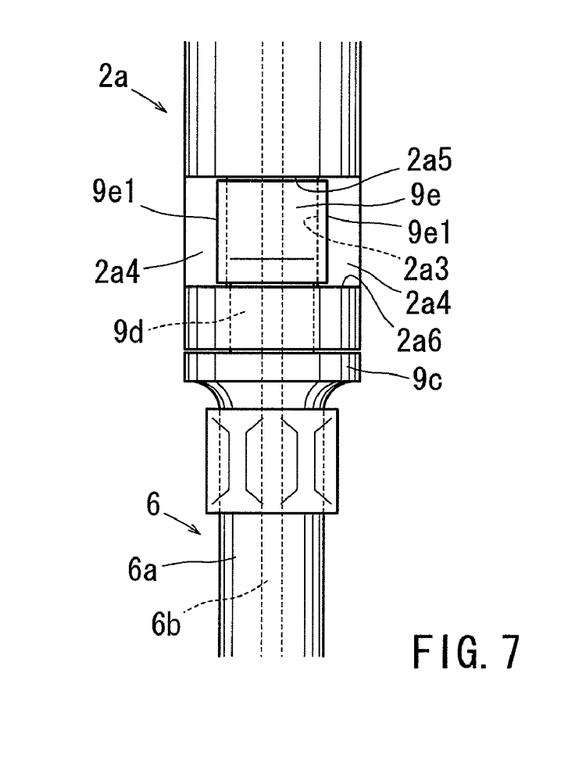
FIG. 7 is a side view of the stay, connector and cable.

The connector 9 is formed of resin and, as shown in FIG. 5, includes a cylindrical body portion 9a, a mounting portion 9b and a pair of locking strips 9d. The mounting portion 9b is configured to mount one end of the cylindrical body portion 9a to a tip end of an outer cable 6a. The locking strips 9d extend from the other end of the cylindrical body portion 9a in the axial direction. The locking strips 9d have a cantilevered shape and include projections 9e protruding in the radial direction at tip ends thereof. The projections 9e have an axial length slightly shorter than the attachment holes 2a3 as shown in FIG. 7. In contrast, the circumferential width of the projections 9e is wider than the attachment holes 2a3, and the projections 9e each have extending portions 9e1 extending over the notched surfaces 2a4 of the stay 2a at both ends thereof. The extending portions 9e1 have almost the same length as the length of the projections 9e in the axial direction.

Figure 8:
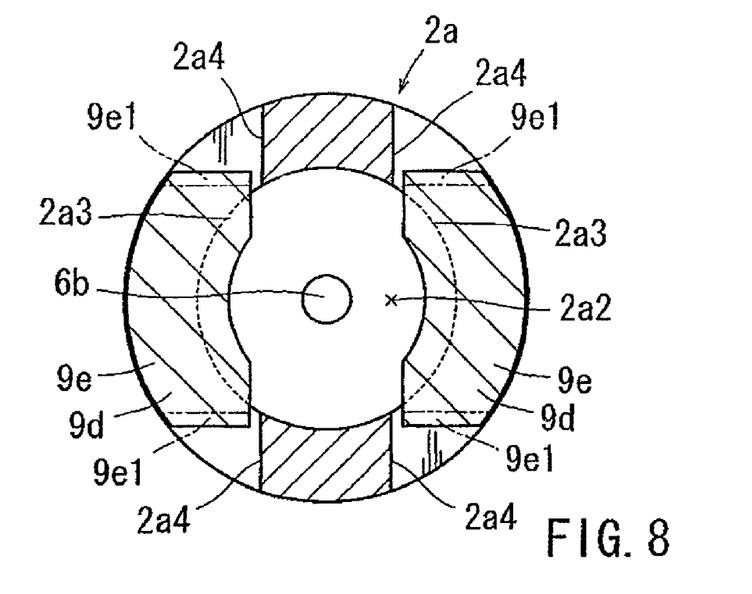
FIG. 8 is a cross-sectional view taken along line VIII-VIII in FIG. 6.
Figure 9:
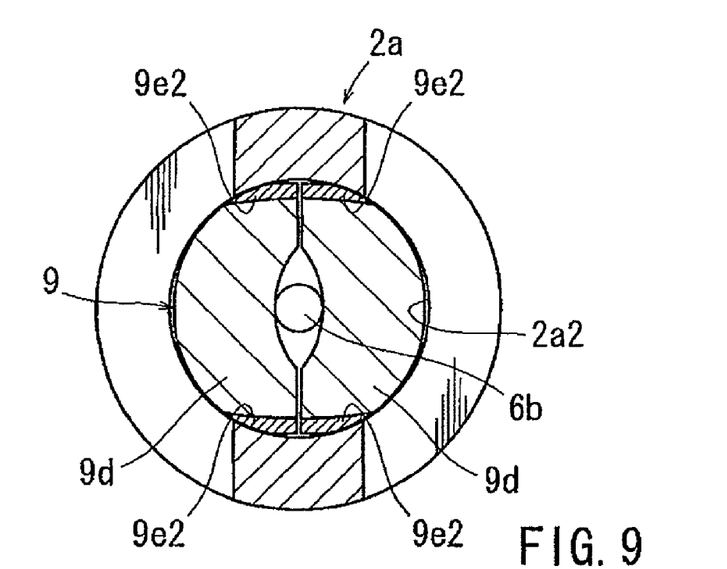
FIG. 9 is a cross-sectional view of the stay and connector in case the connector is inserted into the stay.

When connecting the connector 9 to the stay 2a, first of all, the connector 9 is pushed into the shaft hole 2a2 of the stay 2a as shown in FIGS. 8 and 9. Accordingly, the pair of locking strips 9d are deformed in radial reducing direction, and the tip end portions of the locking strips 9d come close to each other. Simultaneously, the projections 9e resiliently deform in the direction of reducing in circumference, so that the extending portions 9e1 are crushed into crushed portions 9e2. When the projections 9e reach the attachment holes 2a3, the locking strips 9d are resiliently restored. Accordingly, the projections 9e enter the attachment holes 2a3 radially outward and project therefrom. Therefore, the crushed portions 9e2 are resiliently restored. And the crushed portions 9e2 return to extending portions 9e1 and extend over (overlap with) the notched surfaces 2a4.

Figure 6:
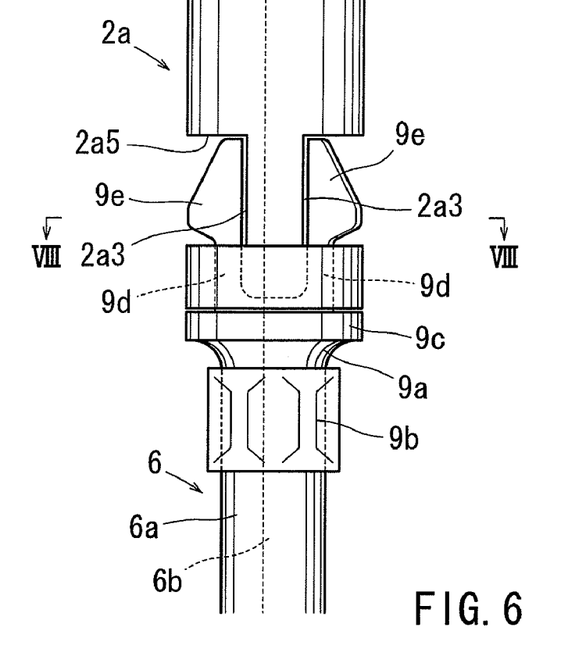
FIG. 6 is a front view of the stay, connector and cable.

As shown in FIGS. 6 and 7, the upper end portions of the projections 9e oppose upper surfaces 2a5 of the holes of the stay 2a located on the upper sides of the attachment holes 2a3. Therefore, the amount of insertion of the connector 9 into the stay 2a is limited by the projections 9e. The proximal end portions of the projections 9e oppose lower surfaces 2a6 of the holes of the stay 2a located on the lower sides of the attachment holes 2a3. Therefore, the connector 9 may be prevented from coming apart from the stay 2a by the projections 9e. The connector 9 includes a flange 9c at the proximal end portion of the cylindrical body portion 9a. The flange 9c opposes the lower end surface of the stay 2a. Therefore, the amount of insertion of the connector 9 into the stay 2a may also be limited by the flange 9c.

The inner cable 6b is slidably inserted into the outer cable 6a as shown in FIG. 5. A column portion 6c provided at the tip end of the inner cable 6b is connected to the connecting portion 5a1 of the swinging body 5a as shown in FIG. 4. Then, the inner cable 6b is disposed along the outer peripheral surface 5a2 of the swinging body 5a, and is inserted into the stay 2a from the entrance 2a1 of the stay 2a located substantially on a tangent line of the arc of the outer peripheral surface 5a2, and then inserted into the outer cable 6a.

Figure 10:
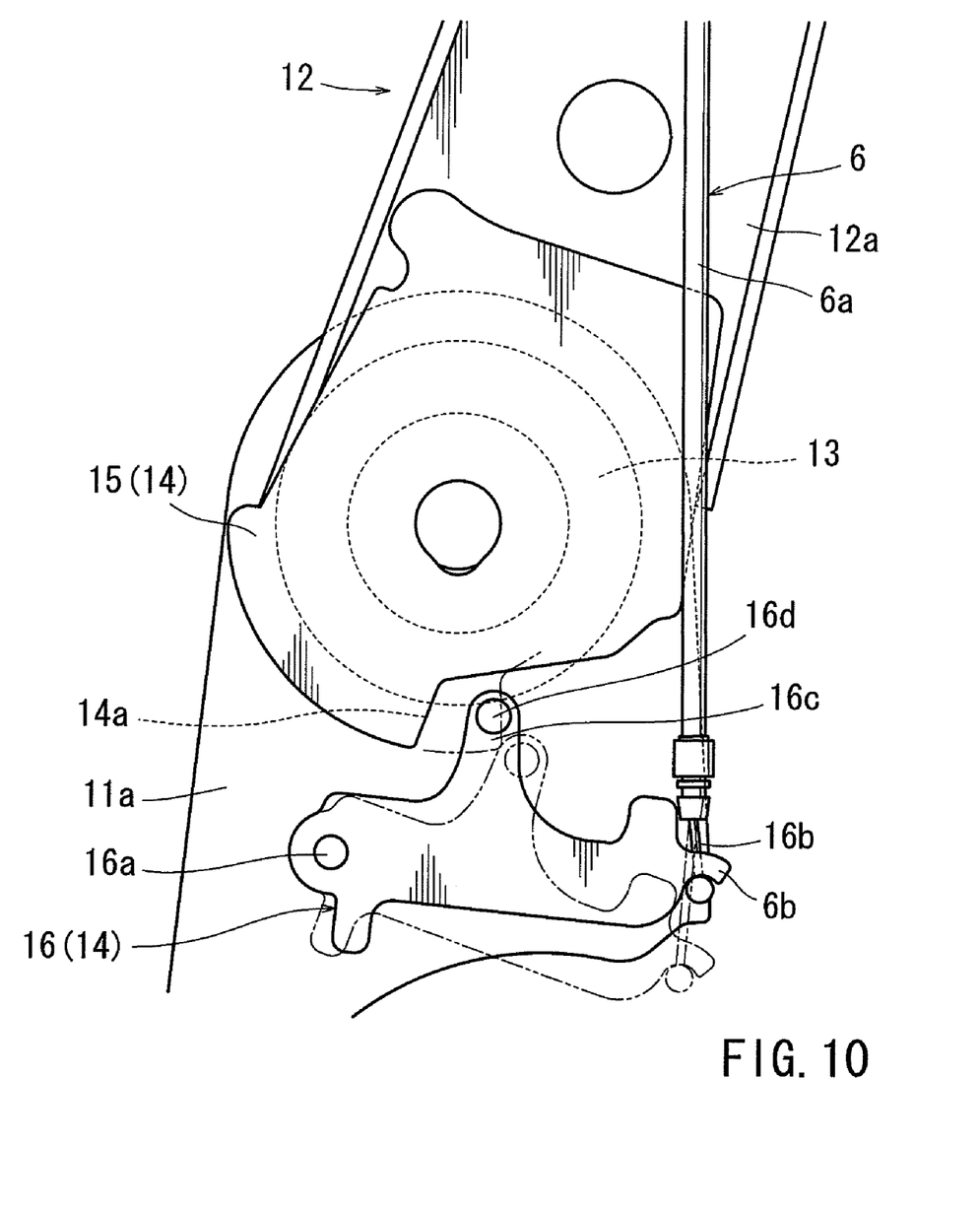
FIG. 10 is a side view of an interlocking device.

The cable 6 is led around the interior of a seatback 12, and the lower end portion of the outer cable 6a is attached to a frame 11a of the seat cushion 11 as shown in FIG. 10. The lower end of the inner cable 6b is attached to a releasing link 16 of an interlocking device 14. The interlocking device 14 is a device interlocking with the forward inclination of the seatback 12 for pulling the inner cable 6b, and includes the releasing link 16 and a kicking member 15.

The releasing link 16 is attached to the frame 11a so as to be capable of tilting as shown in FIG. 10, and the inner cable 6b is connected to the tilting extremity. The releasing link 16 is formed at the center thereof with a force receiving portion 16c overhung toward the kicking member 15. The force receiving portion 16c is provided with a force receiving shaft 16d extending in the direction of the paper plane of FIG. 10. The kicking member 15 is fixed to the end of a frame 12a of the seatback 12, and includes an extending strip 14a extending forwardly of the force receiving shaft 16d. The extending strip 14a swings with the seatback 12, presses the force receiving shaft 16d, and causes the releasing link 16 to tilt, so that the releasing link 16 pulls the inner cable 6b. Consequently, the unlocking device 5 is operated and the locking device 4 is unlocked.

As shown in FIGS. 1 and 2, an operating lever 17 for unlocking the locking device 4 is attached to the side of the headrest 1. The operating lever 17 is attached to one end of the rod 5c as shown in FIG. 4, and is tilted to rotate the rod 5c about an axis thereof. Therefore, by rotating the rod 5c about the axis thereof, the hook 4a tilts to allow the locking device 4 to be unlocked. Therefore, the body frame 3 may be tilted with respect to the base member 2 as needed by the operating lever 17.

Accordingly, as shown in FIG. 5, the stay 2a includes the shaft hole 2a2, the attachment holes 2a3 and the notched surfaces 2a4. The connector 9 includes the cantilevered locking strips 9d, and the locking strips 9d include the projections 9e to be fitted into the attachment holes 2a3. Further, the projections 9e include the extending portions 9e1 which are wider than the circumferential width of the attachment holes 2a3 and extend over the notched surfaces 2a4 by being resiliently restored.

Therefore, the projections 9e overlap with the notched surfaces 2a4 of the stay 2a. When disconnecting the connector 9 from the stay 2a, the user should resiliently deform the locking strips 9d radially toward the center, and resiliently deform the projections 9e in the circumferential direction. Consequently, the connector 9 is engaged with respect to the stay 2a with high degree of stability, and hence a structure having less probability of coming apart from the stay 2a after having used repeatedly.

The extending portions 9e1 are formed across the entire axial length of the projections 9e on both sides thereof as shown in FIG. 7. Therefore, most part of the outer peripheries of the projections 9e overlap with the notched surfaces 2a4 of the stay 2a. Consequently, the amount of maximum projection of the overlapped portion may be reduced while securing the sufficient overlapped surface area. Therefore, a force required for joining the connector 9 to the stays 2a reduces, and assembling work may be facilitated, while it secures a sufficient engaging force between the connector 9 and the stays 2a.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

(1) In FIG. 5, the connector 9 is a connector for attaching the outer cable 6a to the stay 2a. However, the connector may be a connector (harness) which is adapted to be attached to the end of a bundle of electric wires for supplying electric power to electric components provided in a headrest body. And the connector attaches the ends of the electric wires to the end of the stay.

(2) In FIG. 5, the connector 9 includes the projections 9e, and the projections 9e have extending portions 9e1, respectively. However, a configuration in which the extending portion is provided on as least one projection is also applicable.

(3) In FIG. 5, the connector 9 has the pair of locking strips 9d. However, a configuration in which the connector includes one locking strip or three or more locking strips is also applicable.

(4) In FIGS. 5 and 7, the projections 9e include the extending portions 9e1 on both sides thereof. However, a configuration in which the projection is provided only on one side is also applicable.

(5) In FIGS. 5 and 7, the extending portions 9e1 are formed across the entire length of the projections 9e in the axial direction. However, a configuration in which the extending portion is formed on part of the axial length of the projection is also applicable.

(6) In FIG. 5, the stay 2a has a cylindrical shape. However, it may be of a square pipe shape.

This invention claims:
1. A headrest for a vehicle seat comprising:
a tubular stay attachable to a seatback, the stay including:
   a shaft hole,
   an attachment hole extending from an outer surface of the stay to the shaft hole in a radial direction, and
   a notched surface positioned circumferentially adjacent to the attachment hole and substantially orthogonal to the attachment hole; and
a connector connected to an end of the stay, the connector including a cantilevered locking strip capable of being inserted into the shaft hole while being resiliently deformed, wherein:
the locking strip includes a projection that is capable of being resiliently positioned in the attachment hole, further wherein the projection includes an extending portion that is wider than the circumferential width of the attachment hole and is capable of being resiliently extended over the notched surface by being resiliently restored.

2. The headrest for a vehicle seat as in claim 1, wherein the extending portions are formed on both sides of the projection across the entire axial length.

3. The headrest for a vehicle seat as in claim 1, wherein:
the connector is attached to an end of an outer cable for connecting the outer cable to the end of the stay, and
an inner cable is inserted into the outer cable and the shaft hole of the stay.

4. . The headrest for a vehicle seat as in claim 3, wherein:
the inner cable passes through a distal end of the locking strip in a direction generally orthogonal to the attachment hole.

* * * * *